United States Patent [19]

Martinez

[11] Patent Number: 5,304,576
[45] Date of Patent: Apr. 19, 1994

[54] WASTE TIRE DISPOSAL AND RECYCLING

[75] Inventor: David F. Martinez, Houston, Tex.

[73] Assignee: Southwestern Laboratories, Inc., Houston, Tex.

[21] Appl. No.: 930,071

[22] Filed: Aug. 14, 1992

[51] Int. Cl.$^5$ .............................................. C08J 11/04
[52] U.S. Cl. ...................................... 521/41; 521/44.5;
521/45.5; 528/98; 528/491; 528/497; 524/62;
422/261; 152/DIG. 16; 157/1.1
[58] Field of Search ...................... 521/41, 44.5, 45.5;
528/98, 497, 491; 524/62; 422/261; 152/DIG.
6; 157/1.1

[56] References Cited

U.S. PATENT DOCUMENTS

| 866,759 | 9/1907 | Wheeler | 121/45.5 |
|---|---|---|---|
| 2,921,038 | 1/1960 | Gunther | 521/41 |
| 3,027,599 | 4/1962 | Pluhacek | 521/41 |
| 3,725,314 | 4/1993 | Pelofsky | 521/48 |
| 3,815,826 | 6/1974 | Aldrich et al. | 241/1 |
| 4,025,990 | 5/1977 | Levette, Jr. | 241/14 |
| 4,148,763 | 4/1979 | Bryson | 260/2.3 |
| 4,264,481 | 4/1991 | Markvik | 260/23 |
| 4,469,817 | 9/1984 | Hayashi et al. | 521/45.5 |
| 4,813,614 | 3/1989 | Moore et al. | 241/23 |

FOREIGN PATENT DOCUMENTS 1034028  2/1986  Japan.

OTHER PUBLICATIONS

Southwestern Laboratories internal report (pp. 24–32) Sep. 9, 1991.

Primary Examiner—John Kight, III
Assistant Examiner—Duc Truong
Attorney, Agent, or Firm—Ned L. Conley; Marcella D. Watkins

[57] ABSTRACT

A method for recycling a used tire constructed of rubber and other materials that does not devulcanize the rubber, comprising the steps of soaking the tire in a composition comprising an organic solvent for a time sufficient to reduce the tensile strength of the rubber by at least about 50%, applying sufficient shear forces to the soaked tire to disintegrate the rubber from the other materials, and sorting the disintegrated rubber from the other materials.

10 Claims, 1 Drawing Sheet

WASTE TIRE DISPOSAL AND RECYCLING

This invention relates to novel methods and apparatus for processing waste tires to recover useful materials, and to the products of such processes.

BACKGROUND OF THE INVENTION

The disposal of used and discarded tires has posed a problem for almost 100 years, since transportation first began to use rubber tires. Disposal of waste tires is a dilemma for cities, states and industries throughout the United States. It is estimated that at the present time, from two to five billion waste tires occupy landfills and stockpiles. Approximately 280 million additional waste tires are generated each year in the United States alone. For many years governmental agencies, municipalities, industrial corporations and community leaders have worked to reduce this growing stockpile of discarded tires.

Waste tires pose an environmental and health problem. They are not biodegradable. They are unsightly, and provide insect breeding grounds, thereby exacerbating the spread of mosquito-borne diseases. Also, whole tires are difficult to store in landfills because they tend to work their way to the top of the fill and can cause damage to the landfill cap or seal. Many tires are dumped illegally because of the cost associated with placing them in sanctioned dump sites.

In desperation, almost all states have enacted laws, proposed legislation, or adopted proposals to regulate the collection and disposal of waste tires. Already many of these states collect license fees or taxes which are routed to industry and universities for small business start up incentives. A number of states provide R&D funding to solve the waste tire disposal problem.

This has led to investment in tire shredders and similar disposal technologies, so that tires will take up less volume when stored in landfills, and to an increased demand for an efficient and cost-effective method of recycling the tires so that landfilling can be avoided.

The difficulty in processing waste tires arises in separating each tire into its multiple components. The body of a tire typically comprises rubber tread and rubber coated sidewalls. Both natural and synthetic rubbers are used in tire manufacturing, including natural rubber, styrene butadiene (SBR) rubber, polybutadiene rubber, butyl rubber and polyisoprene rubber. To obtain superior strength and wear resistance, the rubber is vulcanized. The resulting toughness contributes to the indestructibility of tires.

In addition, tires are typically reinforced with belts of steel wire and reinforcing fabric or fiber, and include a metal beading strip around their inner diameters. These components are wrapped and bonded together by rubber layers to form a tough, durable tire. It is this very toughness, however, which impedes recycling of the materials in the tire.

There is a commercial market for products, such as scrap rubber, steel, and polyester fiber, recovered from waste tire recycling, provided the cost of the recovery is relatively low. For example, recycled rubber from waste tires can be used in new tires, in asphalt pavement, and in industrial materials.

Most techniques used to recover the recyclable components of waste tires require some initial physical processing, followed by further refining by some secondary process. For example, initial physical processing steps may include: debeading, cryogenic crushing, separation of the sidewalls from the tread,, shredding, and washing.

In cryogenic crushing, liquid nitrogen is used to lower the temperature of the tire to about −300° F. At such a low temperature, rubber hardens and fractures into tiny granules leaving the steel and cotton fibers relatively unaffected. The steel is removed by electromagnets and the cotton is removed by sieving. The cost of cryogenic processing, however, is relatively high.

Secondary processing methods, which convert the materials into a reusable form, include: mechanical reclamation, chemical digestion, destructive distillation, and hydrogenation. In mechanical reclamation, a "reclamator" is used to remove the rubber tread from the fiber and steel reinforcements solely by mechanical means. The reclamator is a type of screw extruder generating its own heat by the mechanical working of the rubber crumb.

In chemical digestion, tires are ground up in a mill and the ground particles are digested in an autoclave at temperatures of approximately 200° C. and a pressure of approximately 400 psi for 5 to 25 hours, in various acids, alkalies or salts mixed with softening oils. At the completion of digestion, the fabric has been dissolved, such as by acids, and the rubber is fragmented into molecules which can be reworked.

Various other chemical processes have been used to recover the chemical constituents of scrap tires. For example, pyrolysis is used to achieve destructive distillation and carbon black recovery. Hydrogenation is used to add hydrogen to the rubber to change its chemical composition to form products from which new elastomers can be produced. Such chemical processes are costly and therefore are of limited value. Also, depending on the nature of the chemical treatment, the rubber may become devulcanized. In some uses for reclaimed rubber devulcanized rubber is preferred, while other recycle applications work as well or better with rubber that has not been devulcanized. Applications in which it is preferred or possible to use vulcanized rubber include asphalt rubber binders for use in asphalt pavement, in carpet underlayers, and tire retreading.

Patent Search Findings

U.S. Pat. No. 4,148,763 describes a method which involves digesting ground scrap tire rubber, freed of wire and fiber, in a reclaim oil combined with a reclaim catalyst. The mixture is rolled and then heated in an autoclave up to 180° C. The rubber obtained at the end of the digestion process must then be refined to remove any hard particles.

U.S. Pat. No. 4,813,614 discloses a method for treating waste products, and in particular waste tires, and recovering the components thereof by lowering the temperature of the products to a temperature at which the waste products can be mechanically crushed. The material is sufficiently crushed that the components thereof can be subsequently separated according to material. Material separation steps can include subjecting the crushed material to magnetic or electrostatic fields, air flows caused by either pressurized air or vacuums, and mechanical separation with vibratory screens and rakes. The separated materials are suitable for recycling.

A similar patent U.S. Pat. No. 4,025,990, discloses recovering the components of waste tires by cooling whole or shredded scrap tires to the embrittlement temperature and then pulverizing the cooled pieces. The pulverization produces rubber, fiber cord, and a ferromagnetic portion resulting from the steel in the tires. These components are then subjected to a series of conventional magnetic and pneumatic separation steps.

U.S. Pat. No. 4,264,481 discloses a method for reclaiming rubber by mixing a desired plasticizer into pulverized scrap rubber which has been substantially freed of impurities. The mixing occurs with the rubber in solid form at temperatures below 100° C. and preferably at or near ambient temperatures. The mixing continues for a time sufficient to ensure that substantially all of the reducing agent has reacted with the double bonds in the rubber. *

Following processing of waste tires into their constituent products, it is desirable to utilize those products in a manner which reduces the need for landfill space. For example, since 1960 public road agencies have experimented with reclaimed rubber from automobile and light truck tires to reduce the reflective and thermal cracking of roads, to suppress traffic noise, to increase resistance to studded tire wear and begin addressing environmental concerns.

Recycled rubber is used in two predominant applications for roadways. One application is in asphalt pavement construction, in which recycled rubber from waste tires is preblended with paving grade asphalt. In asphalt rubber applications, often referred to as reacted rubber, 17% to 25% by weight of ground rubber (i.e. −40 to −200 mesh) is blended with liquid asphalt at an elevated temperature to form a new binder material. This new binder can then be used in the same way as conventional liquid asphalts.

In asphalt rubber, when the granulated reclaimed tire rubber and asphalt are mixed at high temperatures (130° to 200° C.) the rubber particles swell to at least twice their volume. Swelling has been postulated to occur as a result of absorption of lighter oils, partial solubilization and the chemical interactions between rubber particles and asphalt. Mixing results in an increase in viscosity of the asphalt rubber blend. The reacted blend develops into a three dimensional network lattice.

The resulting asphalt rubber structure has a desirable increase in viscosity at roadway service temperatures and improves the binder's strain tolerance, resulting in improved thermal, fatigue, and permanent deformation performance when compared to neat asphalt cements.

Asphalt rubber has found widespread application in stress absorbing membranes (SAMS), which are used as substitutes for conventional asphalt in seal coat construction, and as a treatment placed between layers of a pavement system. Asphalt rubber has also found application in asphalt concrete or asphalt concrete friction courses as a liquid binder mixed with fine and coarse aggregates.

A second application for reclaimed rubber is in rubber filled paving systems, in which scrap rubber is added dry to the aggregate system and mixed with the neat asphalt to form the asphalt concrete mixture. Rubber filled systems are used in applications where spraying is not required, such as in asphalt concrete and asphalt concrete friction courses. In one known paving system, relatively large rubber particles were incorporated into asphalt concrete pavements in order to increase skid resistance and durability.

Reclaimed rubber is also particularly suited for other roadway applications such as in low maintenance rubber crash cushions and rubber modified asphalt pavement for bridge decks. For example, some of the predicted desirable physical properties of rubberized asphalt include improved pavement impermeability, improved resistance to low temperature cracking, increased stability at high temperatures, excellent rideability, better skid resistance, lower noise levels, substantially reduced dead load, and reduced maintenance cost. Other applications for reclaimed rubber include use as a fuel source, conveyor belts, hoses, flooring and floor coverings, and synthetic turf.

The steel fiber reclaimed from waste tires by the process of the present invention is substantially intact, in contrast to steel recovered by conventional processes, which tends to be fragmented into smaller pieces. The steel reclaimed in the present process can be used in any recycled metal application and is well-suited for use in steel-fiber reinforced bitumen. Likewise, the polyester fiber recovered from waste tires can be used in insulation and other suitable plastic recycle applications.

The present invention avoids the deficiencies of the prior art and provides an inexpensive, effective method for recovering recyclable materials from used tires. The present invention is directed at mechanical disintegration of the tires and recovery of the components thereof in a relatively unaltered state. Other objects and advantages of the invention will appear from the following description.

SUMMARY OF THE PRESENT INVENTION

According to this invention, whole waste tires are converted to crumb rubber, scrap steel and fabric. The process uses a solvent to reversibly swell the vulcanized rubber, thereby reducing its tensile strength to a fraction of its original strength, followed by pulverization of the rubber and its removal from the cloth and metal components of the tire. Physical breaking up of the rubber into particles can be achieved by any suitable means, including mechanical rollers or grinders, and is preferably achieved by shearing the rubber with a blasting fluid. The process does not affect vulcanization of the rubber, which is thereby substantially completely removed from the steel and other components of the tire and is ready for use in asphalt paving or in other applications. In addition, the polyester fiber and steel wire reinforcements are recovered and may be sold.

The reclaimed rubber produced by the process of this invention, when combined with asphalt, produces a superior asphaltic composition having a resilience equal to that of commercial grade asphalt rubber (AR). The AR composition also has improved resistance to permanent deformation at high temperatures and improves low temperature cracking resistance.

BRIEF DESCRIPTION OF THE DRAWING

For a detailed description of a preferred embodiment of the invention reference will now be made to the accompanying drawing wherein.

DESCRIPTION OF THE PREFERRED EMBODIMENT

Figure 1:
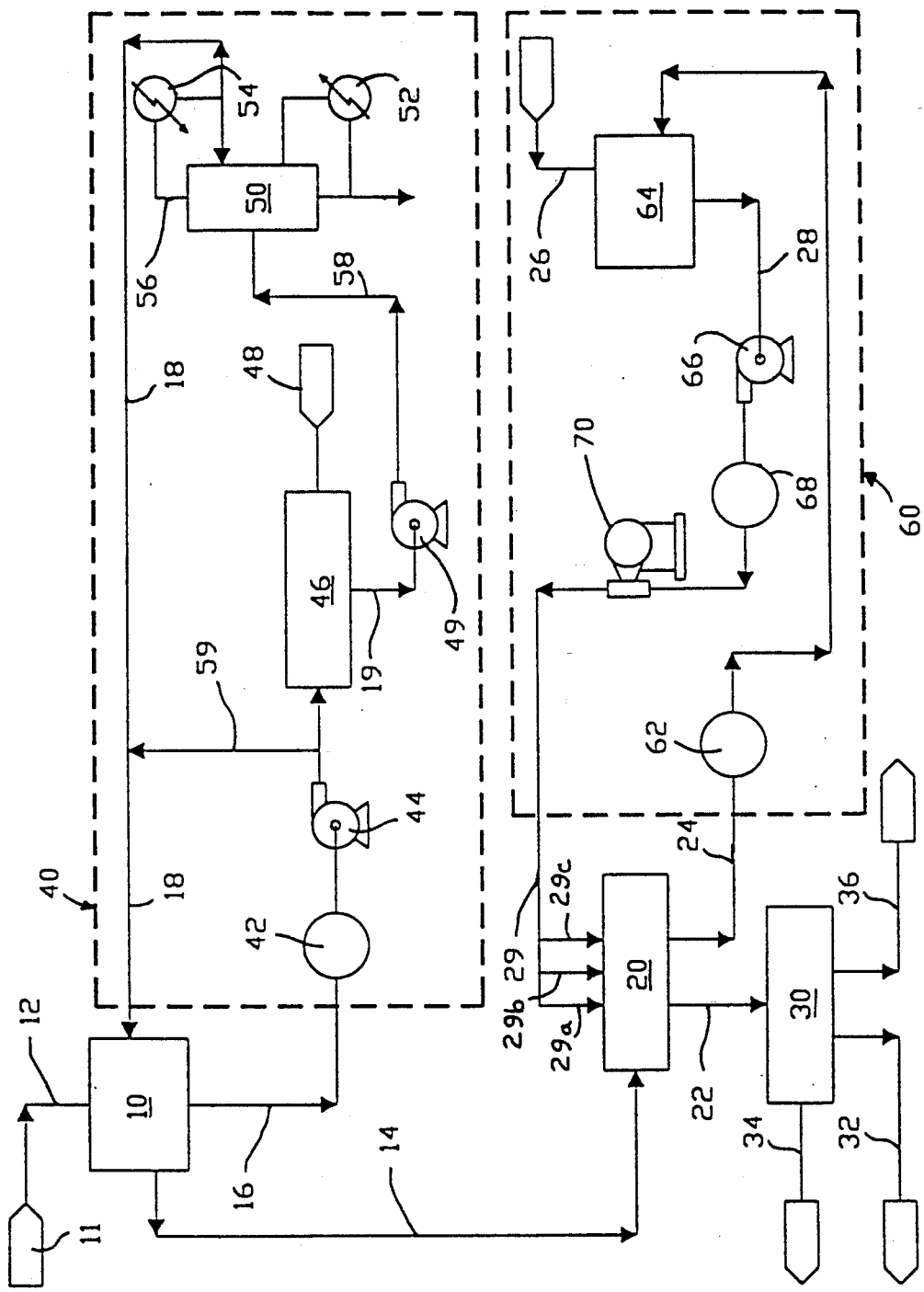
FIG. 1 is a schematic diagram of apparatus for practicing the process of this invention.

The present invention discloses a method and apparatus for breaking down waste tires and reclaiming the components thereof. The method comprises softening the rubber of each tire in a suitable solvent until the tensile strength of the rubber in the tires is significantly reduced, and then applying shear forces to the tire, thereby causing the rubber to be cleanly sheared from the tire carcass.

The force needed to pulverize the solvent-soaked tires can be applied by any suitable method, including blasting with a pressurized liquid or compressed gas, blasting with solid particles, or mechanical pulverization, such as crushing or grinding. In the preferred method, a pressurized liquid is used, as discussed in greater detail below.

The method and apparatus of the present invention may be operated in batch mode, continuous mode, or in semi-batch mode, or the separate processes of the method may be operated in various modes, as desired. The preferred mode of operation is described below, and is essentially continuous.

Apparatus

Referring initially to FIG. 1, the system comprises a soak tank 10, a pulverization chamber 20, and a separation chamber 30. In addition, a solvent recycle system 40, and a blast fluid recycle system 60 may be included.

Waste tires in an untreated state are fed via line 12 to soak tank 10 along with a solvent stream 18. Line 12 may be any suitable conveying means, such as a belt or robotic arm, that is capable of carrying the tires to soak tank 10 in a desired manner. Soak tank 10 is sized to accommodate a desired number of tires and sufficient solvent to submerge same. The number of tires desired to be submerged at one time is determined by the process rate and desired residence time of the tires within the soak tank 10. Soak tank 10 may be open or closed, depending on the volatility of the solvent used.

Tires that have soaked for a sufficient period are removed from soak tank 10 and carried via line 14 to pulverization chamber 20. According to the preferred embodiment, pulverization of the tires is accomplished by subjecting the solvent-soaked tires to at least one, and preferably a plurality, of fluid jets 29a, 29b, 29c. When the action of jets 29a-c on the tires has disintegrated the tire into recyclable components, rubber, steel and fabric, the components are removed from the pulverization chamber via line 22. The blasting fluid is also removed from the pulverization chamber via line 24.

The recyclable components of the tires are carried via line 22 to a separation chamber 30, in which they are separated by conventional means. Suitable separation means include sieves, magnets, and air separation.

It will be understood that those lines which are designed to carry solid materials, such as lines 14, 22, 34, 32, 36, may be any suitable solid conveyor lines such as belts, chutes, troughs, robotic arms, and in some instances, screw conveyors.

As shown in FIG. 1, it is preferred to include a solvent recycle system 40, which is connected between solvent exit line 16 and solvent feed line 18. Solvent recycle system 40 comprises a filter, 42 a pump 44, an accumulation chamber 46, a second pump 49, and separation tower 50. Filter 42 may include a conventional filtration means, or may comprise a plurality of filters. Solvent flows from tank 10 through line 16 to filter 42 and then to pump 44, which may be any conventional pump, and pumps the solvent to solvent accumulation tank 46 where solvent make up can be added as necessary from a source 48.

Optionally, solvent recycle system 40 may include a bypass line 59, which permits some or all of the solvent to be recycled without passing through separation tower 50. It may desirable to reduce energy costs by distilling only a fraction of the solvent, depending on the rate at which waste material is dissolved in the solvent. Pump 44 may be omitted if it is not necessary for the transfer of solvent from soak tank 10 to accumulation tank 46 or recycle line 18.

Solvent is transferred from accumulation tank 46 to separation tower 50 by means of line 19 via pump 49, which pressurizes the solvent sufficiently to cause it to rise the necessary amount to enter separation tower 50. Separation tower 50 is preferably a conventional separation column with a heat source at the bottom so that a lighter fraction of the entering fluid, the solvent, is removed as vapors through the top and condensed for recycle, while a heavier fraction, the waste material, is recovered as bottoms. It is preferred, but not necessary, that heat be recovered from both the bottoms stream 58 and the overhead stream 56 by heat exchangers 52, 54, respectively. The higher boiling components are removed via line 58 and disposed of in a suitable manner.

It will also be noted that in the preferred embodiment, a blast fluid recycle system 60 is connected between the blast fluid outlet line 24 and the blast fluid inlet line 29 connected to pulverization chamber 20. Blast fluid recycle system 60 comprises a filter 62, accumulation tank 64, pump 66, filter 68, and blast pump 70. Filters 62, 68 may be any suitable filtration means such as is known in the art. Make up blast fluid is provided as needed to water accumulation tank 64 via line 26. Tank 64 and pump 66 are also conventional equipment, although tank 64 may also be adapted to provide for gravity separation of solvent from the blast water, with the separated solvent leaving tank 64 via recycle line 65 (shown in phantom), which is connected to solvent accumulation tank 46. If the solvent used is one that is miscible or soluble in the blast fluid, a separation column (not shown) may be included upstream of accumulation tank 64, with recycle line 65 adapted to carry the separated solvent from the separation column to solvent accumulation tank 46.

Blast pump 70 must be capable of pressurizing a desired blast fluid volume to a pressure adequate to disintegrate the softened tire when the blast fluid is applied through nozzles in the pulverization chamber. Pressure and nozzle size are selected to provide an impact force sufficient to disintegrate the tires in the solvent-swollen state. Preferably, blast pump 70 is capable of attaining a pressure of at least 1,000 psi, and still more preferably of at least 3,000 psi.

The solvent from accumulation tank 64 flows via line 28 through pump 66, filter 68, and blast pump 70. From blast pump 70, blast fluid inlet line 29 carries the pressurized blast fluid to pulverization chamber 20.

Method

According to this invention, waste tires are soaked in a solvent for a period of time sufficient to reduce the tensile strength of the rubber by at least about 50% and preferably by 80% to 95%. During this soaking period, the rubber swells until its volume is increased to approximately 150% to 300% of its original volume.

The solvent used to soak the tires must be a chemical formulation which will cause rubber to swell and lose its tensile strength. Many aromatic, aliphatic, and halogenated hydrocarbons., and particularly those having 12 or less carbon atoms, are suitable for this purpose. For example, a composition of chloroform mixed with toluene produces excellent results. In addition, methylene chloride or various ethers mixed with toluene produce good results. Because rubber is essentially nonpolar, nonpolar solvents are generally more effective.

Examples of some of the chemical formulations which have been tried as solvents in the present process are listed in Table I, the Table of Formulation Screenings, below. In Table I, the presence of a chemical's name on the federally published SARA 313 list is used as an indication of toxicity. Many other solvents also give good results, and Table I is not an exhaustive list of possible formulations.

In the interest of safety, it is preferred to use a solvent that is not on the SARA-313 list and is non-flammable. A preferred material is therefore 1,3,5-trimethylbenzene (mesitylene). 1,3,5-trimethylbenzene has a molecular weight of 120.20, and a boiling point of 164.7° C. Another suitable material is a mixture of approximately equal parts of two hydrocarbon blends, available under the commercial names of Aromatic 150, and HAN 957, respectively, from Exxon Corp. of Dallas, Tex. HAN 957 comprises 95% aromatics and 5% olefins, and aromatic 150 comprises 98% aromatics (75% $C_{10}$) and 2% aliphatics. The HAN 957 boils between 181° C. and 266° C., and Aromatic 150 boils between 183° C. and 210° C.

The soaking period in the solvent may be as little as four hours or as long as 48 hours, depending upon the thickness of the tire and the particular solvent used. The soaking is preferably carried out at ambient temperatures and pressures, and is preferably carried out at a temperature below about 140° F. Although heating is not generally preferred because excessive heat contributes to devulcanization of the rubber, heating will accelerate the swelling process. The soaking is continued until the strength of the rubber is reduced to a desired point, with the length of the soaking dependent on the solvent used and the desired degree of softening.

Preferably, there is a continuous low volume flow of the solvent through the recycle system 40, in order to remove dirt and trash that may accumulate in the bottom of soak tank 10 and to regenerate the solvent as needed. Thus, as the solvent flows across the bottom of the soak tank and through the solvent filter, contaminants are removed from the solvent along with some of the solvent which must then be replaced by clean solvent in the solvent accumulator. If the solvent is to be recycled, it passes through separator 50 and is condensed from the top stream thereof. The bottoms stream will include metals, catalysts, and other undesired components of the tire that have washed out of the rubber and into the solvent.

Once the desired degree of swelling has occurred, the tires are transferred to a pulverization chamber, where the softened rubber is disintegrated and removed from the steel and fabric components. As stated above, the pulverization may be achieved by any suitable pulverization or grinding means and is preferably acheived by blasting with a pressurized fluid stream. The fluid used for blasting may be a gas, such as nitrogen, carbon dioxide, air, or dry steam, which are non-reactive at ambient temperatures, or the blasting fluid may be a liquid. If the blasting fluid is a liquid, it may be either the same formulation that is used as the solvent in the softening step, or it may be another liquid.

Alternatively, some combination of mechanical grinding and fluid blasting may be used to break up the tire. For example, the whole, softened tires could be subjected initially to chopping or shredding, resulting in large pieces of tire, which could then be disintegrated by fluid blasting.

If the blasting fluid is selected to be a different liquid from the solvent used in the previous step, it is preferred but not necessary that the blast fluid be immiscible in the solvent. If the two are miscible, then a separator will be required in order to recycle at least one, and preferably both, of the liquids and to avoid the necessity of disposing of large quantities of blast fluid contaminated with solvent. If the two liquids are not miscible, then the separation tank 64 described above will suffice for separating the mixture.

At present, the preferred blast fluid is water, because of its low cost and ease of handling, although other blast fluids may result in lower separation cost, depending on the solvent used. Because nonpolar solvents are generally preferable for softening the rubber, and are also immiscible with water, which is polar, it is anticipated that separation can be accomplished with simple gravity separation, if the blast fluid used is water.

A fluid pressure of 2,300 psi has been found to be sufficient to disintegrate the rubber at a reasonable rate, but it is expected that higher nozzle pressures would result in more rapid disintegration of the rubber. During the course of the disintegration by the fluid stream, some of the solvent may be removed from the crumb rubber. This solvent is preferably recovered from the blasting fluid by conventional separation techniques, such as gravity separation in accumulation tank 64, as described above.

Once the tire has been reduced to its separate components, it is transferred to separation chamber 30, where the rubber, steel, and fiber components are separated by conventional methods, as discussed above.

The rubber leaving pulverization chamber 20 contains some amount of solvent still absorbed therein. If allowed to dry in air at ambient temperature for a period of time, the solvent will evaporate from the rubber. If drying occurs in a drying chamber (not shown), the evaporated solvent can be condensed and recycled. The dried rubber is not devulcanized and regains its tensile strength and elastomeric properties. If the crumb rubber is to be used in an asphalt mix, it is believed that this drying step may be omitted without impairing the effectiveness of the rubber in the asphalt.

Used blast fluid, containing small amounts of solvent washed from the rubber, exits pulverization chamber 20 and flows via line 24 through a first filter 62, to blast fluid accumulation tank 64, which may be adapted to allow the solvent and blast fluid to separate therein. A recycle line 65, shown in phantom, carries solvent that has been separated from the blast fluid back to solvent accumulation tank 46, while the separated solvent is achieved and sent to the pulverization chamber.

The cost of producing crumb rubber in accordance with this process is significantly lower than that of producing crumb rubber by other known methods. For example, plant cost is less than half the cost of the plant for tire granulation by pyrolytic processing and gross margin per tire is from two to four times as much as the gross margin by the other processes.

In addition, all components of the tire are commercially recyclable. In particular, the present invention addresses a recycle application for the recovered rubber. It is known that modifying neat asphaltic materials with rubber for use in roadways significantly improves the performance of the paving asphalt mixtures.

Accordingly, asphalt samples were prepared to compare the effectiveness of the crumb rubber made according to this invention with a commercial grade asphalt rubber composition, with neat asphalt as a control. The asphalt used was AAG-1, and the asphalt rubber samples comprised 15% rubber and 85% asphalt. The commercial rubber was crumb rubber produced by conventional mechanical grinding, and therefore not devulcanized. The following table shows the results of this comparison.

Table II
TABLE II

| Test | Test Standard | Neat Asphalt | Asphalt & Commercial Rubber | Asphalt & Reclaimed Tire Rubber |
| --- | --- | --- | --- | --- |
| Ring & Ball Softening, °F. | ASTM D-36 | 120 | 136 | 140 |
| Resilience @ 77° F., % | ASTM D-3407 | 0.0 | 7.0 | 7.1 |
| Viscosity @ 140° F., cp | ASTM D-4402 | 1,826 | 564,000 | 860,000 |
| Viscosity @ 275° F., cst | ASTM D-4402 | 243 | 1,975 | 2,850 |

*Units of viscosity are $cm^2/sec \cdot 10^2$.

The increased viscosity of the composition containing the crumb rubber of this invention probably is due to creating a network or structure between the asphalt and rubber during mixing, which allows asphaltic molecules to penetrate the rubber particles. It has been noted that applying a solvent to the rubber particles to swell them prior to blending the rubber particles into the asphalt appears to facilitate this viscosity increase. Components of the asphalt appear to penetrate more readily into the crumb rubber of this invention than into rubber produced by prior art processes.

While increased viscosity at mix temperatures (~275° F.) makes mixing more difficult, the viscosity of the mix can be adjusted by adjusting the rubber content. The significant increase in the asphalt viscosity at road surface temperatures (~140° F.) is a desired trait, as it improves the mix's resistance to permanent deformation. Permanent deformation is a primary cause of asphalt pavement premature failure.

EXAMPLE

A piece of tire measuring 2.0×0.5 inches is soaked in mesitylene for 20 hours and then subjected to a water blast of 2,500 psi. After one minute of blasting there is clean separation of the rubber, steel and fabric. The crumb rubber produced from this operation is allowed to dry and then is mixed in commercial grade asphalt at a ratio of 15% rubber and 85% asphalt. The product resulting has a resilience of 7.1% as compared to zero for plain asphalt, it has a viscosity at 140° F. of 860,000 centistokes as compared to 1,826 centistokes for ordinary asphalt, and under the ring and ball softening (ASTM D-36) it softens at 140° F. as compared to 120° F. for neat asphalt.

While a preferred embodiment of the invention has been shown and described, modifications thereof can be made by one skilled in the art without departing from the spirit of the invention.

TABLE IA

FORMULATION SCREENINGS

| Composition | Run Number | | | | | | | | | | | | | | | | | | | | | | |
|---|---|---|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Chloroform | 80 | 78 | 74 | 64 | 78 | 88 | 100 | | | | | | | | | | | | | | | | |
| Toulene | 16 | 16 | 16 | 16 | 16 | 8 | | | | | | | | | | | | | | | | | |
| Acetone | 4 | 6 | 10 | 20 | 6 | 4 | | | | | | | | | | | | | | | | | |
| Methylene Chloride | | | | | | | | 100 | | | | | | | | | | | | | | | |
| Methylpyrol | | | | | | | | | 100 | | | | | | | | | | | | | | |
| Furan | | | | | | | | | | 100 | | | | | | | | | | | | | |
| EG Ethylether | | | | | | | | | | | 100 | | | | | | | | | | | | |
| Dipentane | | | | | | | | | | | | 100 | | | | | | | | | | | |
| Tetrahydrofuran | | | | | | | | | | | | | 100 | | | | | | 30 | | | | |
| Methanol | | | | | | | | | | | | | | 100 | | | | | | | | | |
| Isopropanol | | | | | | | | | | | | | | | 100 | | | | | | | | |
| Exxon 150 @ 150° C. | | | | | | | | | | | | | | | | 90 | 90 | 90 | 70 | | | | 50 |
| Exxon 150 @ 110° C. | | | | | | | | | | | | | | | | 10 | 10 | 10 | | | | | |
| Exxon 150 @ 120° C. | | | | | | | | | | | | | | | | | | | | 100 | | | |
| Heptane | | | | | | | | | | | | | | | | | | | | | 100 | 100 | 50 |
| Performance Criteria | | | | | | | | | | | | | | | | | | | | | | | |
| Qualitative Swelling | Y | Y | Y | Y | Y | Y | Y | Y | Y | Y | Y | Y | Y | Y | Y | Y | Y | Y | Y | Y | N | N | Y |
| Auto-Separation | Y | Y | Y | N | Y | Y | Y | Y | N | N | N | N | N | N | N | N | N | N | N | Y | N | N | N |
| Separation by Hand | Y | Y | Y | Y | Y | Y | Y | Y | Y | Y | Y | Y | Y | Y | Y | Y | Y | Y | Y | Y | Y | Y | Y |
| Ambient Temp. | Y | Y | Y | Y | Y | Y | Y | Y | Y | Y | Y | Y | Y | Y | Y | Y | Y | Y | Y | N | N | N | Y |
| On SARA 313 | Y | Y | Y | Y | Y | Y | Y | Y | N | N | N | N | N | N | N | N | N | N | N | N | N | N | N |

TABLE IB

FORMULATION SCREENINGS

| Run Number | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|---|---|---|---|---|---|
| Composition | | | | | | | | | | | | | | | | | | | | | | | |
| Chloroform | | | | | | | | | | | | | | | | | | | | | | | |
| Toluene | | 50 | 50 | 50 | 90 | 100 | | | | | | | 25 | 50 | 75 | 50 | | | | | | | |
| Acetone | | | | | | | | | | | | | | | | | | | | | | | |
| Methylene Chloride | | | | | | | | | | | | | | | | | | | | | | | |
| Methylpyrol | | | | | | | | | | | | | | | | | | | | | | | |
| Furan | | | | | | | | | | 25 | 50 | 75 | | | | | | | | | | | 50 |
| Exxon 150 @ 150° C. | | | | | | | | | | | | | | | | | | | | | | | |
| Exxon 150 @ 110° C. | 50 | | | | | | | | | | | | | | | | | | | | | | |
| Exxon 150 @ 120° C. | | | | | | | | | | | | | | | | | | | | | | | |
| Heptane | 50 | | | | | | 25 | 50 | 75 | 75 | 50 | 25 | | | 25 | | | | | | | | |
| EG Butylether | | 50 | | | | | | | | | | | | | | | | | | | | | |
| PG Methylether | | | 50 | | | | 75 | 50 | 25 | | | | 75 | 50 | 25 | 25 | | | | | | | |
| HAN | | | | | | | | | | | | | | | | | 100 | | 50 | | | | |
| Aromatic 200 | | | | | | | | | | | | | | | | | | 100 | | | | | |
| Aromatic 150 | | | | | | | | | | | | | | | | | | | 50 | | | | |
| Aromatic 100 | | | | | | | | | | | | | | | | | | | | | | | |
| Varsol | | | | | | | | | | | | | | | | | | | | 100 | | | |
| Telura | | | | | | | | | | | | | | | | | | | | | 100 | | |
| Mesitylene | | | | | | | | | | | | | | | | | | | | | | 100 | |
| Dipentene | | | | 50 | 10 | | | | | | | | | | | | | | | | | | 100 |
| Performance Criteria | | | | | | | | | | | | | | | | | | | | | | | |
| Qualitative Swelling | Y | Y | Y | Y | Y | Y | Y | Y | Y | Y | Y | Y | Y | Y | Y | Y | Y | Y | Y | Y | Y | Y | Y |
| Auto-Separation | N | Y | Y | N | N | N | N | N | N | N | N | N | N | N | N | N | N | N | Y | N | N | Y | N |
| Separation by Hand | Y | Y | Y | N | N | Y | Y | Y | N | Y | N | Y | Y | N | Y | Y | Y | Y | Y | Y | Y | Y | Y |
| Ambient Temp. | Y | Y | Y | Y | Y | Y | Y | Y | Y | Y | Y | Y | Y | Y | Y | Y | Y | Y | Y | Y | Y | Y | Y |
| On SARA 313 | N | Y | Y | Y | Y | Y | N | N | N | N | N | N | Y | Y | Y | Y | N | N | N | N | N | N | N |

I claim:

1. A method for recycling a used tire comprising natural or synthetic vulcanized rubber reinforced with reinforcing fiber that does not devulcanize the rubber, said method comprising the steps of:
   soaking the tire in a composition comprising an organic solvent for a time sufficient to swell the vulcanized rubber and reduce the tensile strength of the vulcanized rubber by at least about 50%;
   applying a force to the soaked tire to disintegrate the vulcanized rubber from the reinforcing fiber; and
   sorting the disintegrated vulcanized rubber from the reinforcing fiber.

2. The method according to claim 1, further including the step of removing substantially all solvent from the disintegrated rubber.

3. The method according to claim 1 wherein the organic solvent is selected from the group consisting of aromatics, aliphatics, halogenated hydrocarbons, and combinations thereof.

4. The method according to claim 1 wherein the organic solvent is selected from the group consisting of saturated cyclic and aliphatic compounds, and combinations thereof.

5. The method according to claim 1 wherein the organic solvent is 1,3,5-trimethylbenzene.

6. The method according to claim 1 wherein the shear forces are applied by blasting the tire with a blasting fluid with a force sufficient to disintegrate the rubber.

7. The method according to claim 6 wherein the blasting fluid is a gas at ambient temperatures.

8. The method according to claim 6 wherein the blasting fluid is a liquid at ambient temperatures.

9. The method according to claim 8 wherein the blasting fluid is water.

10. The method according to claim 1, further including the step of removing said solvent from said vulcanized rubber.

* * * * *